United States Patent
Krill et al.

(10) Patent No.: US 7,073,749 B2
(45) Date of Patent: Jul. 11, 2006

(54) HIGH ALTITUDE RECONNAISSANCE VEHICLE

(75) Inventors: Jerry A. Krill, Ellicott City, MD (US); Michael W. Roth, Columbia, MD (US); Frederick W. Riedel, Columbia, MD (US); Matthew R. Feinstein, Bethesda, MD (US); William T. Mason, III, Fulton, MD (US); Margaret Ann Darrin, Westminster, MD (US); Rafal P. Szczepanowski, Hanover, MD (US); Vincent F. Neradka, Bethesda, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/892,911

(22) Filed: Jul. 16, 2004

(65) Prior Publication Data

US 2005/0151006 A1    Jul. 14, 2005

Related U.S. Application Data

(60) Provisional application No. 60/549,433, filed on Mar. 2, 2004, provisional application No. 60/487,746, filed on Jul. 16, 2003.

(51) Int. Cl.
*B64B 1/00*    (2006.01)
(52) U.S. Cl. ................. 244/2; 244/5; 244/63; 244/125; 244/126; 89/1.11; 455/431
(58) Field of Classification Search ............... 244/2, 244/63, 96–97, 125–128, 5; 455/431, 12.1; 89/1.11; 416/84
See application file for complete search history.

(56) References Cited

U.S. PATENT DOCUMENTS

| 43,779 | A | * | 8/1864 | Andrews ................. 449/13 |
|---|---|---|---|---|
| 2,616,509 | A | * | 11/1952 | Thomas ................. 416/84 |
| 2,929,581 | A | | 3/1960 | Johnson |
| 3,118,638 | A | * | 1/1964 | Rohr ................. 244/3.16 |
| 3,174,705 | A | * | 3/1965 | Slocum, Jr. et al. ........ 244/172 |
| 4,850,551 | A | * | 7/1989 | Krawetz et al. ............. 244/97 |
| 4,995,572 | A | | 2/1991 | Piasecki |
| 5,056,740 | A | | 10/1991 | Roth et al. |
| 5,348,254 | A | * | 9/1994 | Nakada ................. 244/97 |
| 5,467,681 | A | * | 11/1995 | Liberman ................. 89/1.11 |
| 5,518,205 | A | | 5/1996 | Wurst et al. |
| 6,019,317 | A | | 2/2000 | Simmons et al. |
| 6,119,979 | A | | 9/2000 | Lee et al. |
| 6,260,797 | B1 | * | 7/2001 | Palmer ................. 244/49 |
| 6,324,398 | B1 | * | 11/2001 | Lanzerotti et al. .......... 455/431 |
| 6,354,535 | B1 | | 3/2002 | Perry et al. |
| 6,386,480 | B1 | | 5/2002 | Perry et al. |
| 6,425,552 | B1 | | 7/2002 | Lee et al. |

(Continued)

Primary Examiner—Galen Barefoot
(74) Attorney, Agent, or Firm—Albert J. Fasulo, II

(57) ABSTRACT

An airship deployment system comprises an airship of unique shape having laminar flow over this shape to enable low power propulsion, capable remote control, comprising an inflatable body; a propeller assembly for station keeping and repositioning said airship and capable of being folded into a compacted position and unfolded into an operational position; and a payload, comprising gas for inflating said inflatable body; and means for transferring data between said airship and a remote location; and a missile for carrying said airship in a compacted state to a predetermined location and altitude, and releasing said airship at said predetermined location and altitude. When said airship is released from said missile said inflatable body is inflated and said propeller assembly is unfolded into said operational position.

25 Claims, 6 Drawing Sheets

U.S. PATENT DOCUMENTS

| | | |
|---|---|---|
| 6,568,640 B1 * | 5/2003 | Barnett .................... 244/158.3 |
| 6,581,873 B1 | 6/2003 | McDermott |
| 6,607,163 B1 | 8/2003 | Perry et al. |
| 2003/0236070 A1 * | 12/2003 | Seligsohn et al. ......... 455/12.1 |

* cited by examiner

HIGH ALTITUDE RECONNAISSANCE VEHICLE

CROSS REFERENCE TO RELATED APPLICATIONS

This application claims priority to U.S. Provisional Application No. 60/487,746, filed Jul. 16, 2003, and U.S. Provisional Application No. 60/549,433, filed Mar. 2, 2004, the contents of each of which are incorporated herein by reference.

BACKGROUND OF THE INVENTION

1. Field of the Invention

The present invention relates generally to a system and method for a high altitude reconnaissance vehicle (HARVe).

2. Description of the Related Art

Whether for military or civilian use, atmospheric based vehicles or stations are becoming more commonplace in a society requiring real-time communications and information to be supplied over greater distances. Systems placed in low, medium and high altitude locations include weather balloons, satellites used for reconnaissance or communications, and systems for environmental analysis, to name a few. The existing atmospheric based systems include sensing devices from infrared (IR) and radio frequency (RF) devices, advanced optical devices, each having differing capabilities to detect and/or relay valuable information. Several factors are taken into consideration when designing and deploying these systems. Among these factors are ease of deployment, time required to deploy, altitude requirements, environmental factors the systems are exposed to during both initial deployment and final location, costs, and especially in military applications, vulnerability to ground attack. Each of these factors is weighed during initial design and conception stages.

Existing atmospheric based systems are generally classified into an unmanned air vehicle (UAV), an ultra long-duration balloon (ULDB), a commercial telecommunications balloon (CTB), a high altitude long endurance (HALE) remotely operated aircraft (ROA), and a near-space maneuvering vehicle (NSMV). Each has unique operating altitudes, payload capabilities, ranges, time to deployment, reconnaissance coverage areas, and station-keeping (i.e. remaining relatively stationary at its deployed position) and other characteristics. The UAV has a maximum altitude of about 65,000 feet, a payload of about 2000 pounds, a range of about 3000 nautical miles, a deployment time of more than 24 hours, and a coverage area of roughly 40,000 nautical square miles in a 24 hour period at a 1 m resolution and up to 1900 spot images per mission at 0.3 m resolution. ULDBs are deployed at an altitude of about 110 to 120 kft (kilo feet), can remain deployed for up to 100 days, have a payload capacity of about 6000 lbs., can circumnavigate the earth, and require tether for station-keeping at an altitude of about 60 kft. CTBs are currently licensed by the Federal Communications Commission, are deployed at about 100 kft, and have a coverage area of about the size of Oklahoma. HALE ROA are deployed at about 60,000 feet, can remain aloft for potentially weeks to months at a time, carry a maximum payload of about 200 kg, and can be deployed as both station-keeping and moving over large areas. Finally, NSMVs can ascend to about 120,000 ft, have a range of about 200 nautical miles, can station-keep for about 5 days, can carry a payload of about 100 lbs., consume about 50 Watts of power, but have not successfully flown under propeller power for station-keeping.

The present near-space platforms have a number of disadvantages. UAVs require multiple vehicles to provide continuous, persistent coverage. They also require a support ground crew and its infrastructure. UAVs are also vulnerable to air defenses due to their low altitude and can be grounded by bad weather. ULDBs also have problems. Without propulsion, the ULDBs are unable to station-keep and depend on wind direction for movement. Thus, to station keep they require tethering. With a propulsion system, the ULDBs require periodic refueling and move slowly between the launch area and the on-station location. If manned, the ULDBs need to fly low enough, contain a pressurized cabin or wear masks to provide oxygen for the crew allowing them to be targets to air defenses.

Satellites are also utilized for reconnaissance. Satellites have a different set of problems. Low-earth orbit satellites are only on-station over a particular location for short periods of time. During these short periods, there are a number of competing demands for their resources. Geosynchronous satellites are much further away, requiring more sophisticated optics and electronics to bridge the distance. The lead-time for new satellites is many years, making new satellites unavailable to support short-term needs.

Some of the additional disadvantages associated with present atmospheric based systems include the following. Winged aircraft and most lighter-than-air airships, or tethered aerostats are limited to the lower altitudes with denser atmosphere, thereby limiting their horizon coverage. Further, they require substantial support and are not generally on station for long periods (days or months) due to crew limits, weather vulnerability, and/or equipment reliability. Satellites are expensive to deploy and, although their horizon coverage is great, their distance to the objects of surveillance, and communications relays, combined with on-board power constraints limit resolution, detectibility, and communications bandwidth. Also, a single satellite cannot provide continuous reconnaissance because a platform in low-earth orbit passes outside of the field of view of a target within about ten minutes and does not return for at least one orbit period of about 90 minutes. A geosynchronous-orbit satellite could in theory provide continuous reconnaissance but at enormous cost because of the expensive sensors required for the very long distance to geosynchronous orbit (over 22,000 miles). A constellation of low-earth-orbit satellites could also provide continuous reconnaissance but again at enormous cost because of the significant number of satellites required.

SUMMARY OF THE INVENTION

In accordance with the present invention, an airship deployment system is provided comprising (a) an airship capable of remote control, comprising (i) an inflatable body having a shape to achieve laminar flow; (ii) at least one propeller assembly for station keeping and repositioning said airship and capable of being folded into a compacted position and unfolded into an operational position; and (iii) a payload comprising at least one of a chemically generated and compressed gas for inflating said inflatable body; and means for transferring data between said airship and at least one remote location; and (b) a missile for carrying said airship in a deflated and folded state to a predetermined location and predetermined altitude and releasing said airship at said predetermined location and said predetermined altitude, wherein when said airship is released from said missile said inflatable body is inflated and said at least one propeller assembly is unfolded into said operational position.

Further in accordance with the present invention, a method of deploying an airship having an inflatable body, an airship payload and at least one folding propeller assembly is provided comprising the steps of packaging said airship for high altitude deployment as a missile payload; transporting said airship to a predetermined location and a predetermined altitude as said missile payload; releasing said airship from said missile payload; and deploying said airship at said predetermined location and predetermined altitude.

BRIEF DESCRIPTION OF THE DRAWINGS

Various embodiments are described below with reference to the drawings wherein.

DETAILED DESCRIPTION OF PREFERRED EMBODIMENTS

Figure 1:
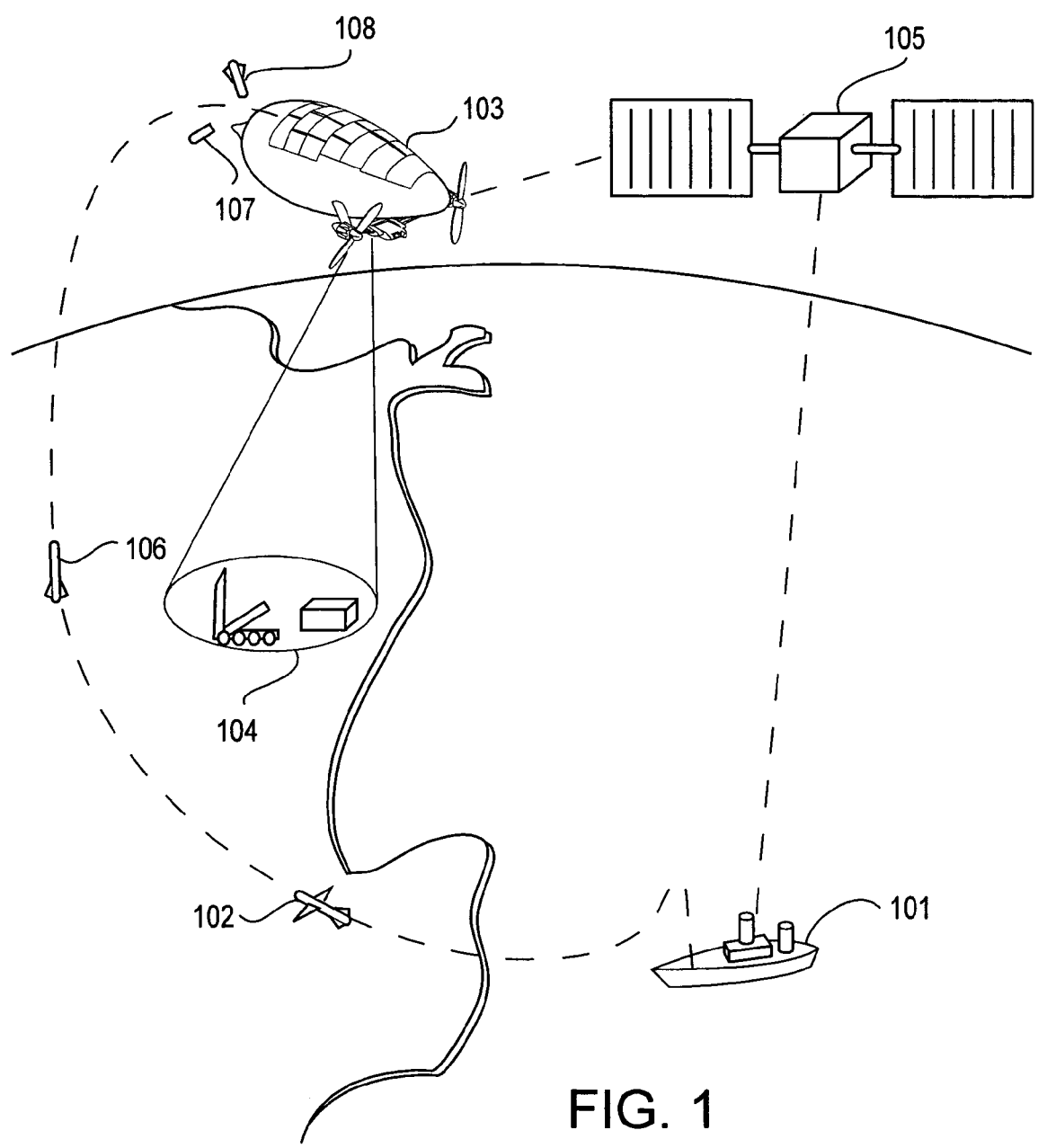
FIG. 1 is a diagram illustrating the overall HARVe system according to a preferred embodiment of the present invention.

Preferred embodiments of the present invention will be described herein below with reference to the accompanying drawings, wherein the same components or parts thereof will be represented with the same reference numerals or symbols to avoid any redundancy or repetition. In the following description, well-known functions or constructions are not described in detail since they would obscure the invention in unnecessary detail.

In general, many recognize the need for a long-duration, stable platform for reconnaissance and communications. A near-space platform occupies a niche between a UAV and a satellite. This type of platform shares the availability, ability to reconfigure, low-cost and rapid launch benefits of UAVs while having the ability to station-keep for extended periods, and provide a general invulnerability associated with high altitude satellites.

The novel, station keeping stratospheric vehicle (station-keeping inflatable platform or "HARVe" as used herein) is initially stored as a missile payload in a compact format. At missile flight altitude, the HARVe is boosted into the stratosphere from a missile into its final aerodynamic and buoyant configuration. The deployability at high altitude, buoyancy, aerodynamic form, solar and hydrogen based power, and small size all contribute to the novelty of the present invention. The HARVe has a small and light payload that allows scaling of the vehicle in feet rather than in tens of feet used in approaches demonstrated to date. The HARVe has a novel aerodynamic shape to create lift and minimize drag by maintaining laminar flow over the entire airship and uses a combination of solar and hydrogen or battery power and propellers that are efficient at high altitude.

Deployment of the HARVe system uses a Tomahawk-like missile to rapidly carry the system to an altitude of about 100 kft. and to the desired location that can be hundreds of miles from the missile launch point. The HARVe is contained in the missile in a folded and compacted state. This use of an existing missile and its infrastructure to launch the HARVe drastically reduces the cost and time to deployment. Normally, deployment of high altitude vehicles is in the order of days or weeks. The use of a missile reduces the deployment time to minutes or hours, instead of days or weeks as is common in the conventional launching systems. To launch and deploy a space satellite costs in the range of millions to tens-of-millions of dollars while the HARVe system is projected to cost significantly less.

FIG. 1 is a diagram illustrating the overall HARVe system according to a preferred embodiment of the present invention. Shown in FIG. 1 are launch platform (ship, plane or ground based mobile launcher) 101 for carrying and initially launching the HARVe. The launch platform 101 in FIG. 1 is shown as a military cruiser, but the concept also includes other launch platforms such as planes, submarines, or land-based mobile launchers. FIG. 1 also shows missile 102, the HARVe in its booster rocket stage 106, and the HARVe in its payload release stage 107. The flight path of the missile 102, and the booster rocket 106 and release stage 107 of the HARVe are shown as a short dashed line. After an initial boost (not shown) used to get the missile out of the launch platform 101, the missile 102 flies a subsonic jet stage or a low supersonic ramjet stage for low altitude flight to carry the HARVe, in its compacted (i.e. deflated and folded) state, to its general area of deployment. When the missile reaches its general deployment location, the booster rocket second stage is engaged. At the booster rocket second stage, the payload 106 (containing the HARVe) of the missile 102 separates from the missile 102 and is carried to the predetermined deployment altitude. This booster rocket stage carries the HARVe, still in its compacted, deflated and folded state, to the required high altitude by the booster rocket 108. When the required altitude is reached, the third stage of deployment, the payload release stage occurs. The payload release stage is the deployment location where the HARVe is disengaged from the booster rocket 108 and shell 107 and undergoes its final deployment processes of inflating and unfolding, which will be described in further detail below. The second booster stage is used to lift HARVe well above the intended deployment altitude. The HARVe would fall to the desired deployment altitude while the balloon inflates. This excess altitude offers the advantage of time as well as low dynamic pressures to facilitate the inflation process.

Figure 2:
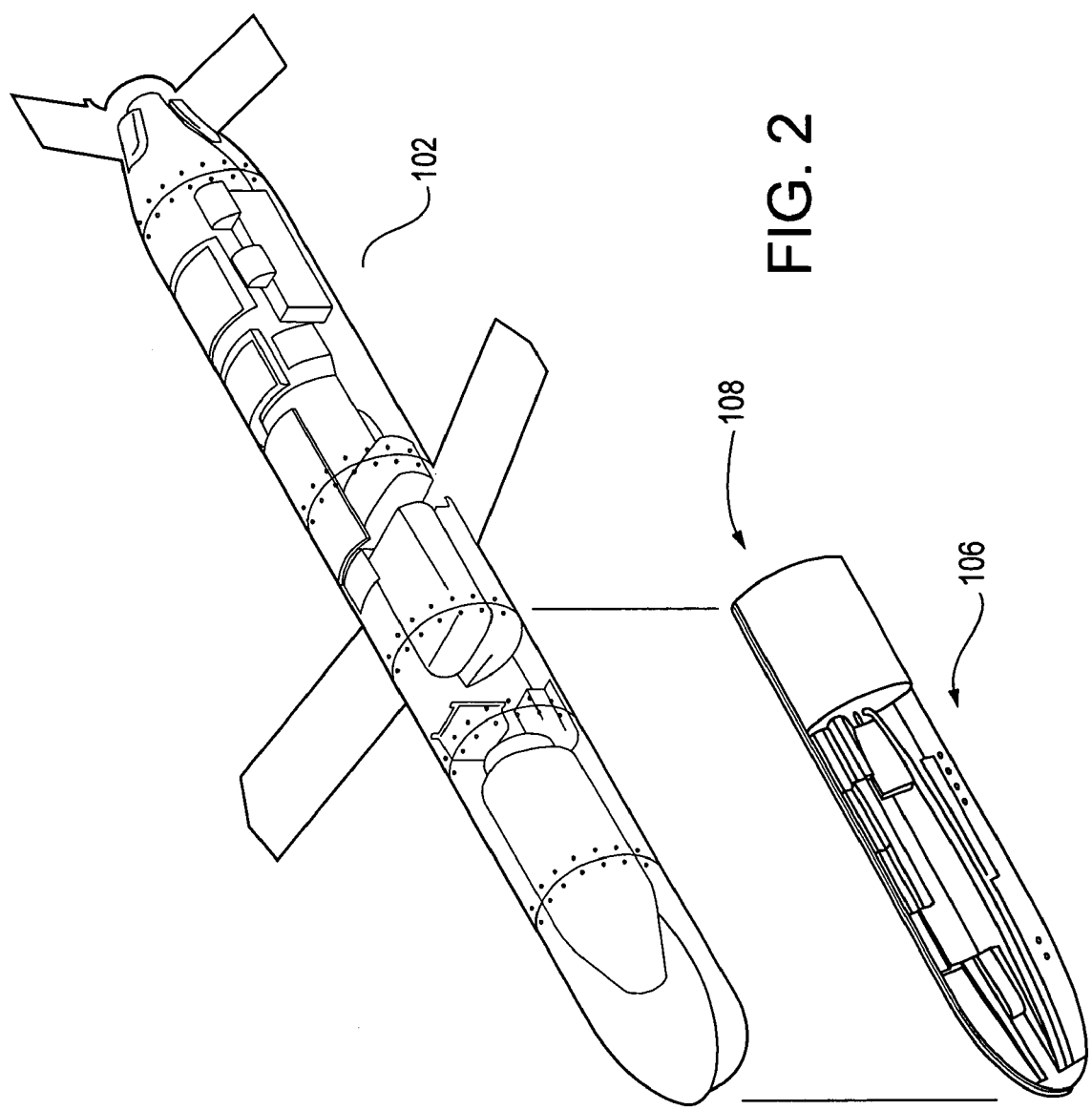
FIG. 2 is a diagram illustrating a replaceable payload section of a Tomahawk missile for launching the HARVe according to a preferred embodiment of the present invention.

FIG. 2 is a diagram illustrating a replaceable payload section of a Tomahawk missile for launching the HARVe according to a preferred embodiment of the present invention. Shown in FIG. 2 are missile 102 and replaceable payload section 106. Replaceable payload section 106 contains an un-inflated and folded HARVe in its launch ready configuration including the second stage booster rocket 108. To fit the HARVe into a Tomahawk missile, the airship and its subsystems (e.g., power system, solar cells, propulsion, sensor/communications package and the inflation gas) are stored in a volume about 9 feet long and 20-⅜ inches in diameter, approximately 20 cubic feet. Once separated from the Tomahawk, the booster rocket 108 lifts the HARVe to an altitude where the airship inflates into its final shape.

Figure 6:
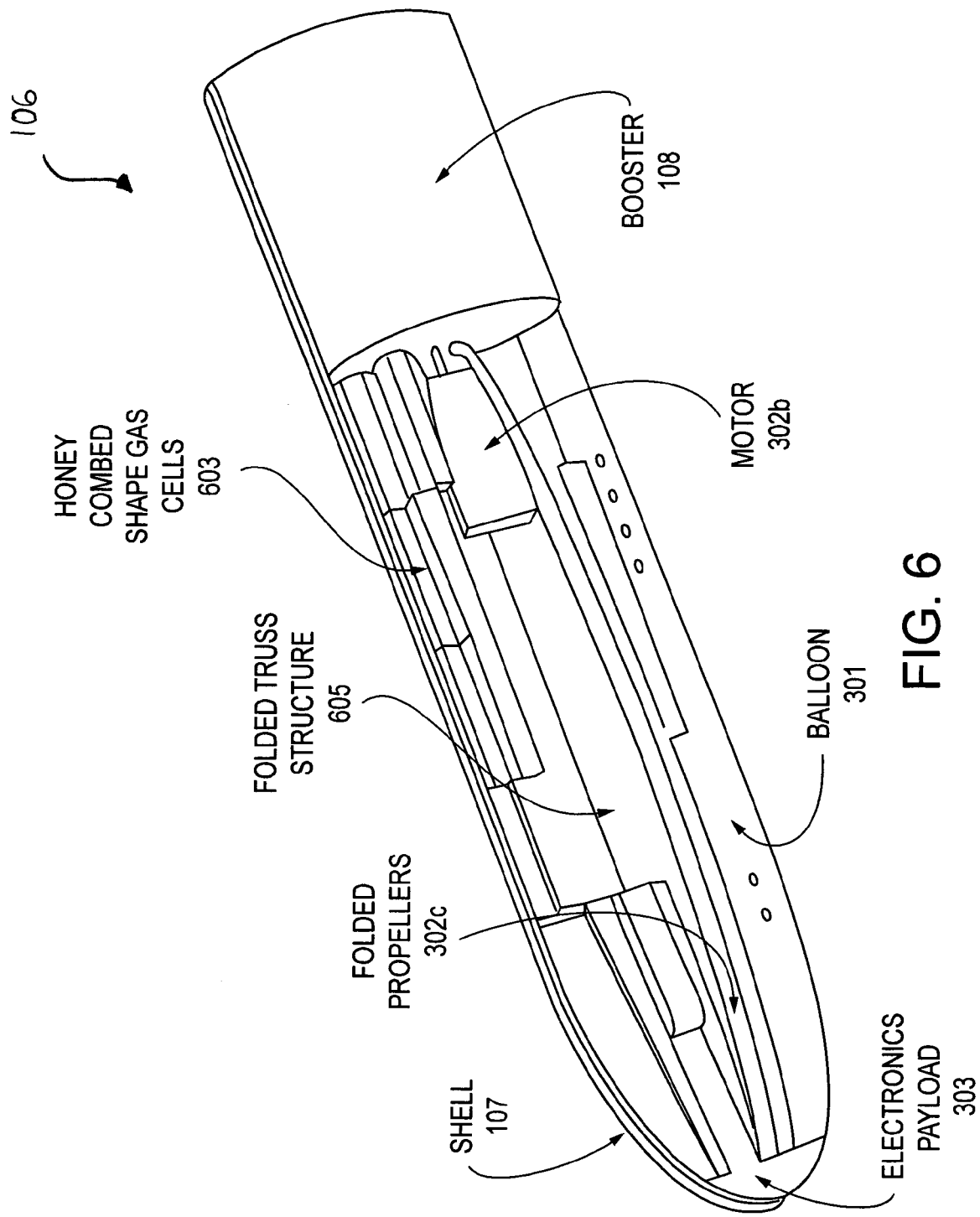
FIG. 6 is a diagram illustrating the HARVe in its payload state.

FIG. 6 is a diagram illustrating the HARVe in its payload state. Shown in FIG. 6 is replaceable payload section 106 also shown in FIG. 2. Replaceable payload section 106 is comprised of shell 107 and booster rocket 108. Within the shell 107 is contained the HARVe in its unfolded and deflated state. Shown within Shell 107 are deflated balloon 301, motor 302b, folded propellers 302c, and electronics payload 303. Folded truss structure 605 is also shown within shell 107. Folded truss structure 605 is the skeletal structure for balloon 301 in its inflated state. Finally, gas cells 603 are shown. The gas cells 603 are used to inflate balloon 301 during its final deployment stage.

Returning again to FIG. 1, fully inflated and unfolded HARVe 103 is shown at its final deployment location and altitude over reconnaissance area 104. A satellite 105 is shown in FIG. 1. Satellite 105 is shown used to relay data and control information in a bi-directional path between the HARVe 103 and the launch platform 101. The HARVe 103 is shown in FIG. 1 communicating with satellite 105, but the use of satellite 105 as a relay is not required as the HARVe 103 can communicate directly with the launch platform 101 or other location. The launch platform 101 and the information and control center can be different. Also more than one control center can exist. In a civilian application, during a civil emergency, a HARVe can be deployed to provide telecommunications to multiple users, or can be used to relay communications for emergency personnel, located in more than one location. The use of satellite 105 in the system can greatly extend the deployment range.

At final deployment, the HARVe 103 would float at a high altitude of about 100,000 feet, which is well beyond the effective range of ground fire and missiles. Higher altitude deployments are possible and within the scope of the present invention. A major advantage of missile launching the HARVe is the ability to fly hundreds of miles from the initial launch position and maneuver to the needed location and altitude quickly to support the need for tactical information. The HARVe system disclosed herein is capable of being rapidly deployed and on-station (i.e. fully deployed) within hours.

The use of a missile deployment vehicle provides major advantages over the existing deployment systems. Deployment from a missile provides for rapid deployment of the airship, placing the airship where and when it is needed instead of waiting for it to float up to the necessary altitude and fly to the desired location. This will cut hours to days off of the time required to reach the station-keeping location. This also eliminates the problems associated with passing large airships through the jet stream. Also, the existing missile infrastructure can be used for transporting and launching of the HARVe, which will greatly simplify integration of the system into the existing infrastructure. Also, the use of a missile-launched system eliminates the need to design and deploy through the lower atmosphere, a location where additional systems are needed to compensate for differing and changing environmental factors.

A number of missile boost flight trajectories were considered for the purpose of deploying the HARVe, namely, ballistic or aerodynamic flight trajectories. When launched, the ballistic missiles are high over the atmosphere, re-entering at high Mach speeds. These trajectories are inappropriate because the speed of the missile would need to be slowed to a near relative stop before the balloon inflation could begin. Flight missiles have wings and fly horizontally through the lower atmosphere, moving at much slower speeds along a predetermined flight path. This type of missile was selected because of the slower flight speed of the second stage boost, which simplifies the final ejection of the HARVe into a deployed position. Subsonic vehicles such as the Tomahawk or hypersonic such as the evolving Hyfly are choice candidates. For this type of missile, the flight plan would terminate in a rapid ascent to the airship deployment altitude. The use of a missile deployment platform provides for a 400+ mile deployment range within minutes to an hour, depending on vehicle selected.

Figure 3:
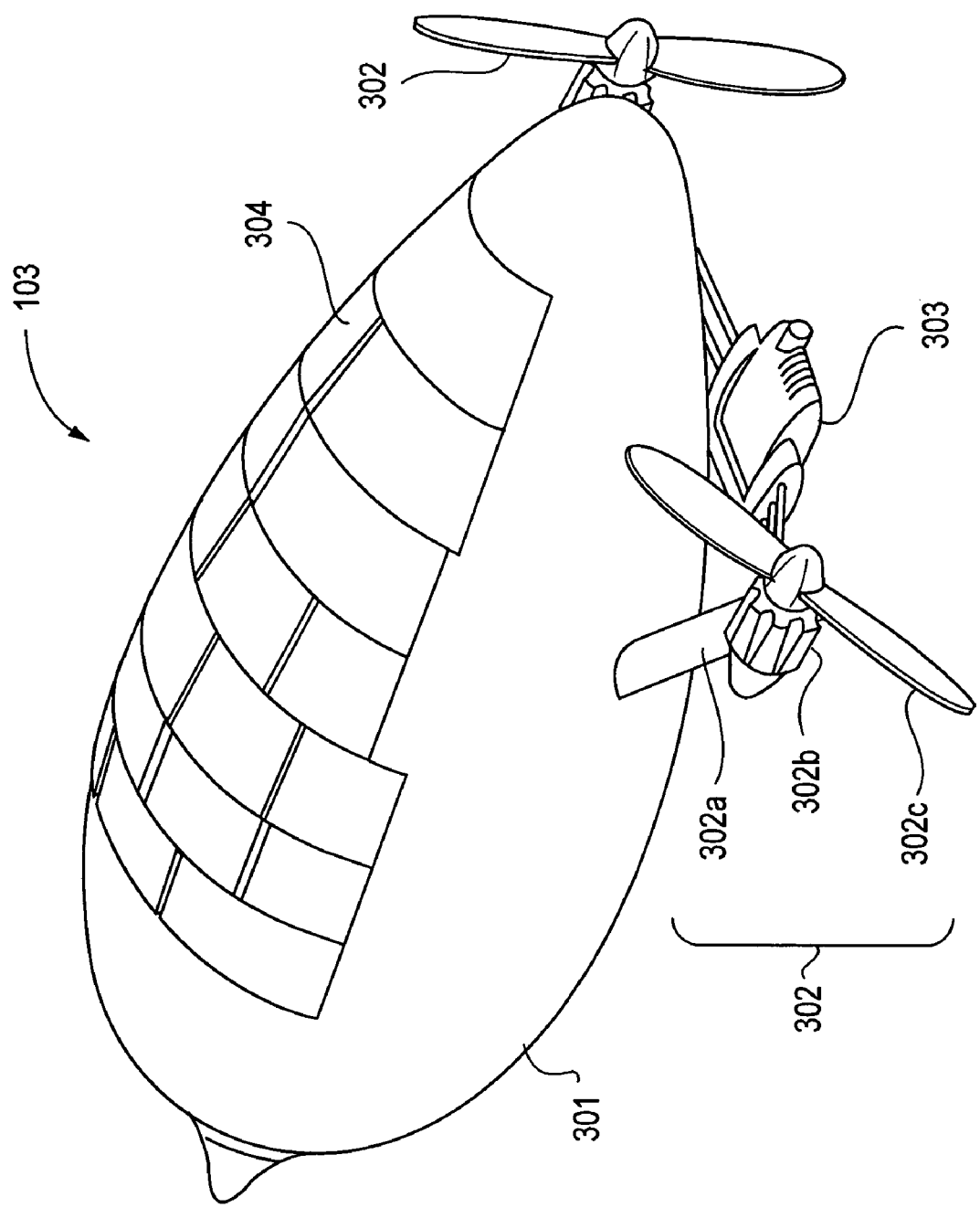
FIG. 3 is a diagram illustrating the overall structure of the HARVe according to a preferred embodiment of the present invention.

The structure of the HARVe is shown in FIG. 3 which is a diagram showing the HARVe in its fully deployed state according to a preferred embodiment of the present invention. The inflatable structure and aerodynamic shape shown in FIG. 3 has been developed to induce laminar flow, which in turn minimizes drag and maximizes power conservation. Upon reaching the required altitude and station location, the HARVe 103 is unfolded and inflated into the configuration shown. The configuration shown in FIG. 3 operates as a directional minimum drag coefficient balloon 301. This configuration is inexpensive and potentially expendable. Although this minimum drag coefficient balloon 301 is shown in the preferred embodiment, other shapes for the balloon section are contemplated. One such other shape is a semi-rigid flying wing shape. The wing shape configuration is more maneuverable. The precise shape of the balloon is determined for optimization of net weight, altitude of deployment, station keeping power minimization, and robustness considerations. The key characteristic of the shape is its maximum minor diameter occurring far aft of the leading edge so as to maintain a favorable pressure gradient as long as possible and thus reducing aerodynamic drag. Robustness deals with the real-life problems of balloon roughness (seams, protuberances for struts, manufacturing tolerances), free stream turbulence, etc. Lift itself is not a primary consideration in the design of the balloon, as the necessary vertical force to maintain altitude is generated by buoyancy alone, but some lift can be generated by pitching the balloon up at an angle of attack.

Returning again to the configuration shown in FIG. 3, balloon 301 is made of a material that is ultra-violet cured by exposure to the sun once it is unfolded and inflated to add to the rigidity of the ultra-thin balloon membrane, and provide support for the solar array. The ultra-violet treatment is added to the exterior of the hull to retain the shape of the balloon 301. Compressed hydrogen or helium gas is stored in a HARVe payload 106. Also contemplated is hydrogen generated from lithium hydroxide LiH Whichever gas is used, it inflates the balloon 301.

As stated earlier, power for the HARVe onboard systems is supplied by a combination of solar power and regenerative hydrogen fuel cells or battery. FIG. 3 shows the solar panels 304 located on the upper portion of balloon 301 of the HARVe 103. The location of the solar panels 304 on the '"loon 301 is shown as only one possible location. The precise placement of the solar panels 304 is calculated and positioned for optimal energy generation. The solar panels 304 in the preferred embodiment are shown attached to the balloon 301 and are unfolded therewith. The HARVe payload 303 is shown attached to the underside of balloon 301. The HARVe payload 303 contains the control, communications and sensor electronics for the HARVe 103, as well as the power and power control systems. As stated earlier, the compact and light payload allows scaling of the vehicle in feet rather than in tens of feet used in approaches demonstrated to date. Also shown in FIG. 3 are propeller assemblies 302. The propeller assemblies 302 are extendable high-efficiency propellers that are unfolded from a stored and folded launch state. In another embodiment of the present invention, the propeller assemblies 302 are designed to be inflated along with the balloon 301, as opposed to being foldable. The HARVe 103 shown in FIG. 3 is pulled by the propeller assemblies 302. Each propeller assembly 302 is comprised of three main components consisting of an arm 302a, motor 302b, and propeller 302c. The motor 302b is contemplated as a light weight plastic motor to reduce the overall weight of the HARVe 103. The motor and transmission elements thereof may be constructed and operated as described in the following patent documents, each of which is incorporated herein by reference in its entirety:

(i) U.S. Non-provisional patent application Ser. No. 10/829,910, filed on even date herewith, entitled "Dielectric Motors with Electrically Conducting Rotating Drive Shafts and Vehicles Using Same," by inventor Jerry A. Krill; and (ii) U.S. Non-provisional application Ser. No. 10 /892,908, filed on even date herewith, entitled "Variable Ratio Transmission Elements for Motor Drive Shafts," by inventor Jerry A. Krill.

As described hereinabove, the HARVe 103 is capable of station keeping. Station keeping describes the control of an airship or platform to maintain its position over a particular location for extended periods of time. The HARVe 103 can station-keep at an approximate altitude of 100,000 ft. Long-duration station keeping and station repositioning with propulsion and energy regeneration for day and night operation in up to 30 knot winds provides for very long duration missions that are on the order of weeks or months. The combination of the design of balloon 301, the small size of the payload 303 and the use of the high-efficient propeller assemblies 302 all contribute to the ability of the HARVe 103 to station keep for the extended periods. In addition to these factors, the novel power system of the HARVe 103 provides added station keeping duration.

The payload 303 of the HARVe 103 according to an embodiment of the present invention incorporates photovoltaic (solar cell) power regeneration capability to meet the sensor, communications and station-keeping power requirements for an extended period of time. Power is also generated by the solar cells 304 during the day and used to charge batteries or electrolyze water of the fuel cell into hydrogen and oxygen gasses for use during the night by a regenerative fuel cell. This would allow station keeping and operation of the sensor and communications, 24 hours a day, 7 days a week.

Figure 4:
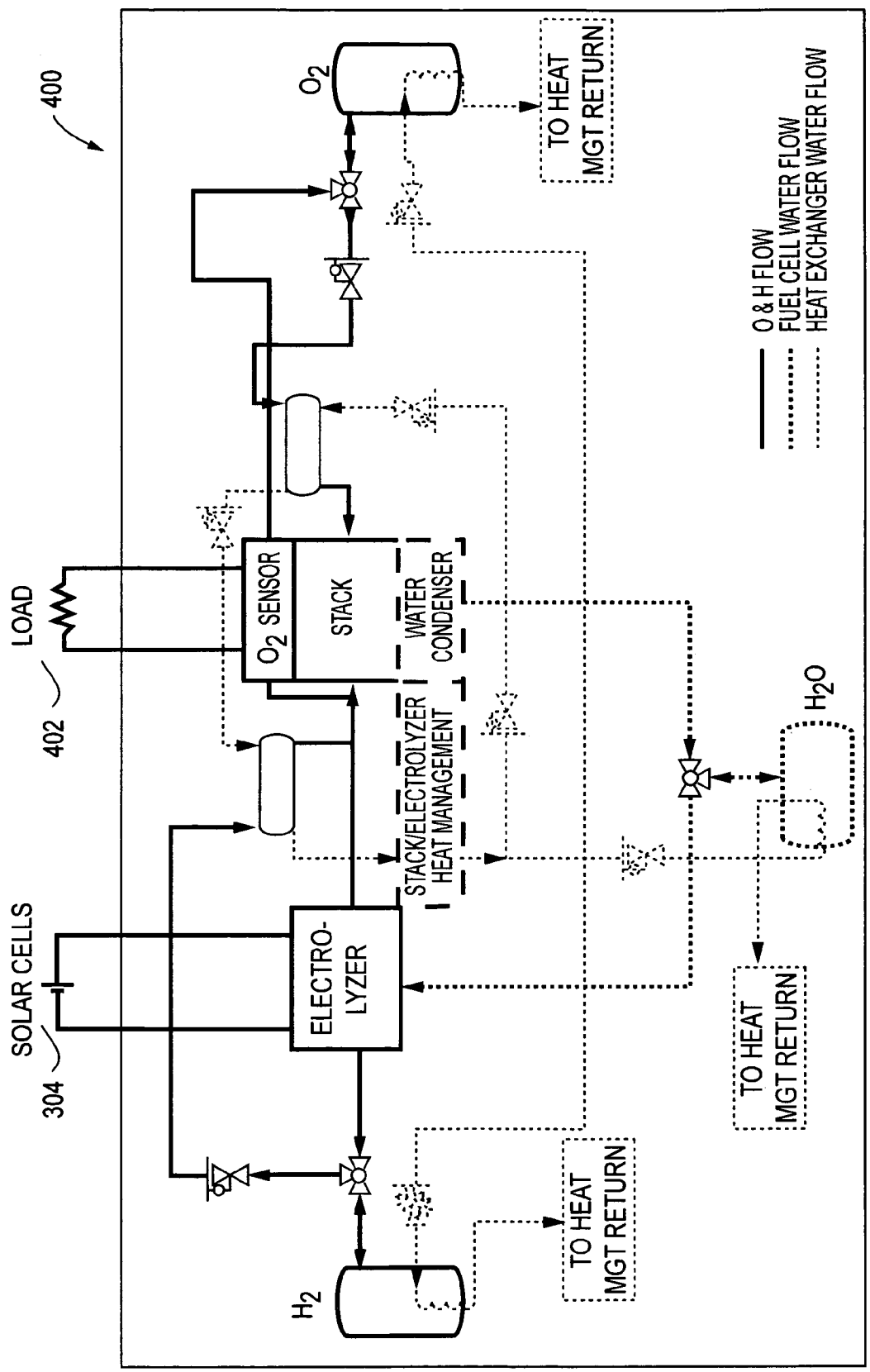
FIG. 4 is a diagram illustrating a regenerative fuel cell system for powering the HARVe according to a preferred embodiment of the present invention.

A regenerative fuel cell system for powering the HARVe according to a preferred embodiment of the present invention is shown in FIG. 4. This approach provides the critical long duration station-keeping performance needed for HARVe 103. Solar cells 304 would generate the hydrogen and oxygen during daylight hours that would be stored for nighttime use. During the night, these gasses would be used for power generation. Waste heat in this process or the battery charging would be used to maintain stable temperatures in critical electronic systems. The fuel cell system 400 is connected to the solar cells 304. These solar cells 304 are the solar panels 304 of FIG. 3. Electric load 402 is also shown connected to the fuel cell system 400, and can comprise any or all of the on-board deployment, positioning, sensor and communications systems. A full description of the regenerative fuel cell system is disclosed in U.S. Patent Application No. 60/533,109, filed Dec. 30, 1993, the contents of which are incorporated herein by reference.

Figure 5:
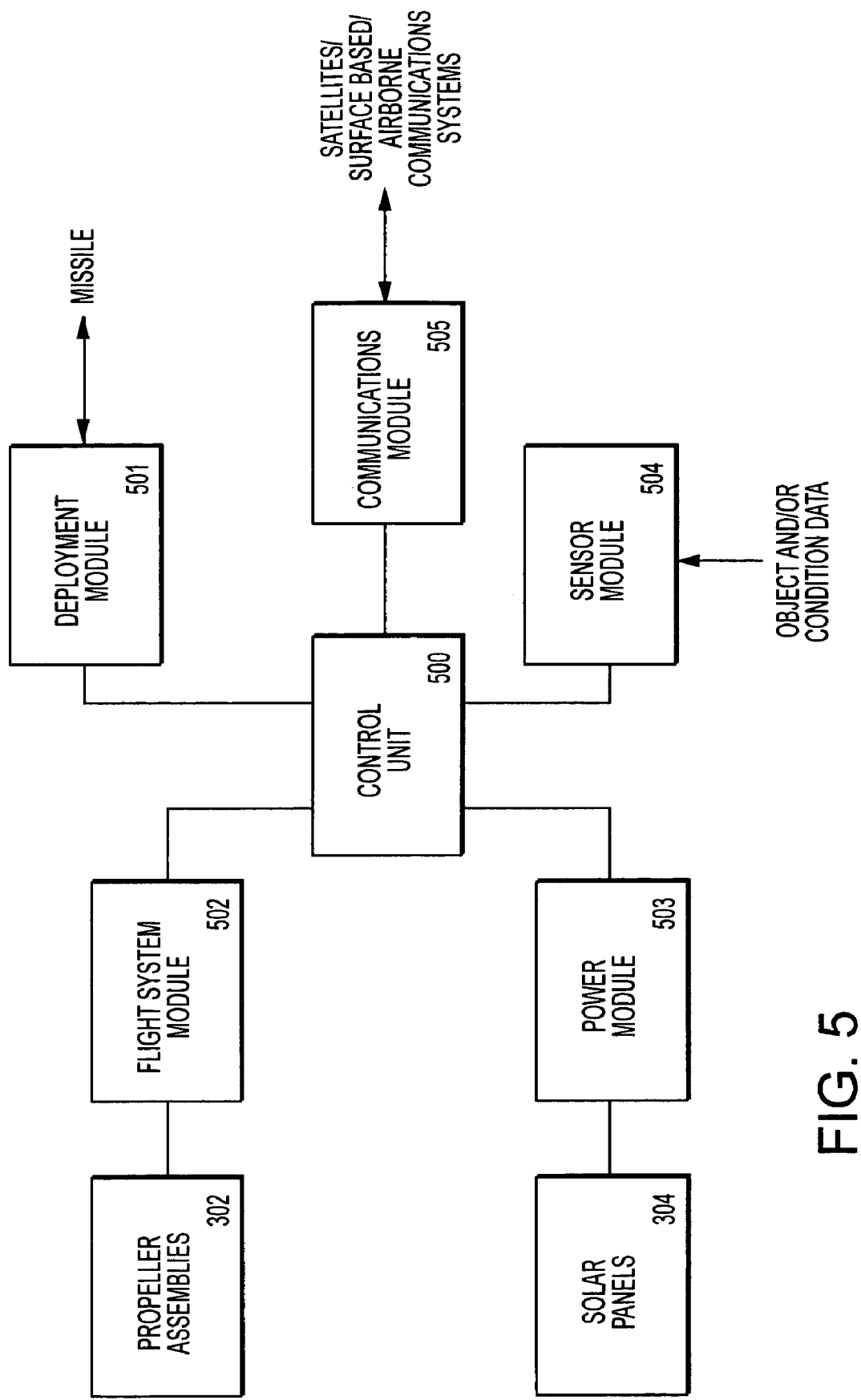
FIG. 5 is a diagram illustrating the onboard control, communications and sensor systems of the HARVe according to a preferred embodiment of the present invention.

FIG. 5 is a diagram illustrating the onboard control, communications and sensor systems of the HARVe according to a preferred embodiment of the present invention. Shown in FIG. 5 are control unit 500 for providing the overall control of the onboard systems of the HARVe 103, deployment module 501 for controlling the booster rocket stage, release stage, inflation and unfolding of the HARVe 103, flight system module 502 for controlling the post-deployment flight systems for station keeping and station repositioning, power module 503 for providing power and power control to the HARVe 103, sensor modules 504 containing the various sensors with which the HARVe 103 is equipped, and communications module 505 for providing a communication link to and from the HARVe 103.

A description of the systems of the HARVe will now be made with reference to FIGS. 1, 3 and 5. When the HARVe 103 reaches its initial deployment location and altitude at the release stage, booster rocket 108 and shell 107 are disengaged from the HARVe 103. At this point in time the deployment module 501, under control of the control unit 500, begins to deploy the HARVe 103. As stated earlier, final deployment consists primarily of inflating the balloon 301 and unfolding the propeller assemblies 302 and payload 303. Upon full deployment, flight system module 502 will begin to take control of the final positioning, station keeping and relocation functions. In order to control these functions, the flight system module will control the propeller assemblies 302. Several existing systems can be used to assist in these functions. For example, a global positioning system (GPS) can be incorporated into the HARVe 103 to accurately position and station keep the HARVe 103 over reconnaissance area 104. Power module 503 controls production, storage, regulation and supply of power to the other on-board systems. Power module 503, in the preferred embodiment, contains the rechargeable batteries or the regenerative fuel cell system 400 of FIG. 4. In addition, power module 503 is connected to solar panels 304. Power module 304 supplies and controls the supply of power to all of the on-board deployment, flight system, sensor, and communications modules. Sensor module 504 contains and controls the various sensors with which a particular HARVe 103 might be equipped. Data related to objects and/or conditions with in the range of the sensors is collected and processed by the sensor module 504.

One of the major advantages of the HARVe 103 is its ability to be configured for varying and specific tasks. While a military application may require high-resolution optical sensors to conduct reconnaissance and targeting missions requiring one configuration, a civilian emergency response may require a plurality of communications channels to be available to emergency response teams. Whichever the application, the HARVe 103 can be loaded with the required sensors and quickly deployed. It is contemplated that The HARVe can be made modular to accommodate different sensing suites. These can be changed out either in the factory or at depot level, exactly as is done currently with warheads on Tomahawk. Different payloads are installed on missiles at the factory and a ship or land vehicle can be outfitted with missiles with different HARVe types. Other sensors can include, for example, inflatable, optically phase-compensated RF scanning arrays and real time optical imagery systems.

The HARVe 103 can perform a variety of missions such as reconnaissance, sensing of weapons arsenals, and communications to provide the ground or ship commander with timely information for tactical decision-making. Communications module 505 contains the equipment required to conduct communications with surface based command posts or airborne command posts directly or through satellites. Any or all of these locations are available to the HARVe 103 as replaceable modules in the preferred embodiment. Thus depending on the particular application, the HARVe can be quickly configured with the required modules and quickly deployed.

Major advantages are available with the HARVe system of the present invention. Deployment at or above 100,000 ft optimizes the design and reduces the requirement to design a system that must travel, in a fully deployed state, through the lower atmosphere. Remaining at or above 100,000 ft provides low vulnerability in hostile environments because the system is largely stealthy (mostly plastic) and because surface to air missiles (SAMs) are generally ineffective at this altitude. The HARVe is so low in cost that many can be deployed. Because the HARVe is small enough to be deployed from a missile, the packaging and deployed energy consumption is unique relative to the prior art airships. The HARVe can be deployed as part of a network of sensors and communications (with other HARVes, aircraft, ships, ground vehicles, satellites, etc.) uniquely selected to match the constraints and advantages of 100,000 ft altitudes. Furthermore, the HARVe is a relatively inexpensive system so as to be expendable, yet it can be at-station within minutes. Finally, by manufacturing the electric motor and transmission elements from plastic, the overall weight of the HARVe can be reduced even further, which would require less power and lift requirements.

Civil emergency response restoration of broadcast services or cellular services, emergency support providing surveillance, command and control, or other potential applications such as contiguous coastline security monitoring and science observation, are all contemplated herein as further functions the HARVe provides in an inexpensive and quickly deployed system to cover many differing applications.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of deploying an airship having un inflatable body, an airship payload and at least one propeller assembly comprising the steps of:
    packaging said airship in a compacted state for high altitude deployment as a missile payload within a missile;
    flying said missile to a general area of deployment;
    separating said missile payload from said missile at the general area of deployment;
    boosting said separated missile payload to a predetermined location and a predetermined altitude;
    releasing said airship from said boosted missile payload; and
    deploying said airship at said predetermined location and predetermined altitude, wherein said deploying comprises the steps of:
        inflating said inflatable body with one of a compressed gas and a chemically generated gas carried in said airship payload at a rate to maintain said predetermined altitude; and
        deploying said at least one propeller assembly into an operational position for station keeping and relocating said airship, wherein said at least one propeller assembly is one of a foldable propeller assembly and an inflatable propeller assembly.

2. The method of claim 1, wherein said general area of deployment is at a first altitude and said predetermined location and predetermined altitude is at a second altitude higher than said first altitude.

3. The method of claim 1, wherein said deploying step further comprises: initializing a communications system contained in said payload for transferring data between said airship and at least one remote location.

4. The method of claim 1, wherein said deploying step further comprises:
    initializing at least one sensor system contained in said airship payload for collecting data relating to at least one object or condition remote from said airship.

5. The method of claim 1, wherein said predetermined altitude is greater than an effective altitude range of a conventional surface-to-air missile.

6. The method of claim 1, wherein said deployed airship relays radio communications signals.

7. The method of claim 1, wherein said deployed airship is capable of collecting data relating to at least one object or condition remote from said platform.

8. The method of claim 1, wherein said missile payload is contained in a missile launched from one of a surface, sub-surface, ground-based and airborne launch platform.

9. An airship deployment system comprising:
    an airship capable of remote control comprising:
        an inflatable body having a shape to achieve laminar flow;
        at least one propeller assembly, for station keeping and repositioning said airship, capable of being folded into a compacted position and unfolded into an operational position; and
        a payload, comprising:
            at least one of a chemically generated and compressed gas for inflating said inflatable body; and
            means for transferring data between said airship and at least one remote location;
    a missile payload having packaged therein said airship in a deflated and folded state; and
    a missile configured to retain and fly said missile payload to a general area of deployment and separate from said missile payload at said area of deployment, whereat said missile payload boosts itself to a predetermined location and predetermined altitude, whereat said missile payload releases said airship,
    wherein when said airship is released from said missile payload said inflatable body is inflated and said at least one propeller assembly is unfolded into said operational position.

10. The system of claim 9, wherein said inflatable body is made of a material that is ultra-violet cured by exposure to the sun once it is unfolded and inflated.

11. The airship deployment system of claim 9, wherein said payload also comprises at least one remote sensing device for collecting data and information related to at least one object or condition remote from said airship.

12. The airship deployment system of claim 9, wherein said predetermined altitude is greater than or equal to an altitude range of a conventional surface-to-air missile.

13. The airship deployment system of claim 9, further, comprising:
    a regenerative power source comprising:
        one of a rechargeable battery and a regenerative hydrogen fuel cell power system; and
        a solar power system for providing power to regenerate said hydrogen fuel cell power system or to recharge said rechargeable battery.

14. The airship deployment system of claim 13, wherein said solar power system comprises solar panels located on said inflatable body.

15. The airship deployment system of claim 9, wherein said missile is capable of being launched from one of a surface, sub-surface, ground-based and airborne launch platform.

16. The system of claim 9, wherein said missile payload includes a rocket booster for boosting said separated missile payload from said general area of deployment to said predetermined location and predetermined altitude.

17. A high altitude reconnaissance Vehicle (HARVe) having an inflatable body, at least one foldable propeller assembly, and a payload, said payload comprising:
   a deployment module for controlling deployment of said HARVe
   a flight system module for controlling flight systems of said HARVe;
   a power module for providing and regenerating power for said HARVe;
   a communications module for providing data networking with another communications equipped HARVe; and
   a control unit for providing overall control of said HARVe,
   wherein said inflatable body is deflated and said at least one foldable propeller assembly is folded in a missile payload, said HARVe is released at a predetermined location and a predetermined altitude, said inflatable body is inflated, and said at least one foldable propeller assembly is unfolded, and
   wherein said inflatable body is made of a material that is ultra-violet cured by exposure to the sun once it is unfolded and inflated.

18. The HARVe of claim 17, wherein said communications module relays radio communication signals.

19. The HARVe of claim 17, wherein said payload further comprises a sensor module for collecting data related to at least one object or condition remote from said HARVe.

20. The HARVe or claim 17, wherein said deployment module controls the inflation of said inflatable body and the unfolding of said at least one foldable propeller assembly.

21. The HARVe of claim 20, wherein said flight system module controls said at least one propeller assembly for station keeping and relocating a deployed HARVe.

22. The HARVe of claim 17, wherein said power module comprises:
   a regenerative hydrogen fuel cell system for providing power to the HARVe; and
   a solar power system for providing power to recharge said hydrogen fuel cell system.

23. The HARVe of claim 17, wherein said predetermined altitude is at or above 100,000 feet.

24. The HARVe of claim 21, wherein said station keeping occurs at an altitude at or above 100,000 feet.

25. The HARVe of claim 17, wherein said HARVe is configured to be packaged along with a booster rocket in said missile payload for boosting said missile payload.

* * * * *